H. A. JAMIESON.
Piston-Packings.
No. 147,643. Patented Feb. 17, 1874.
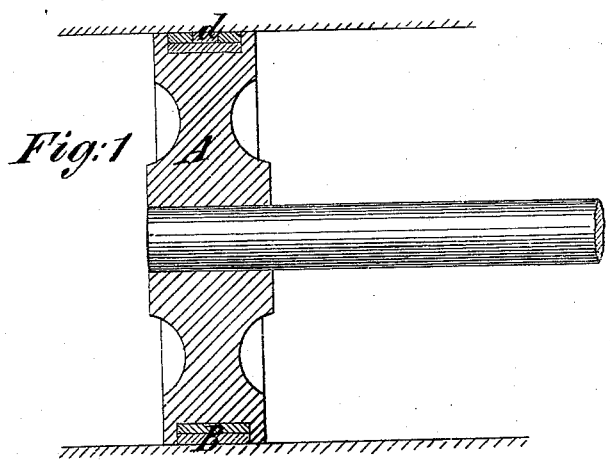
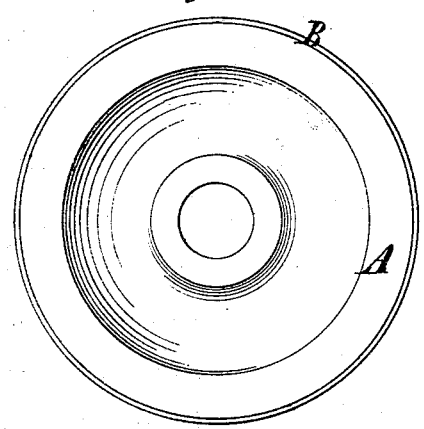  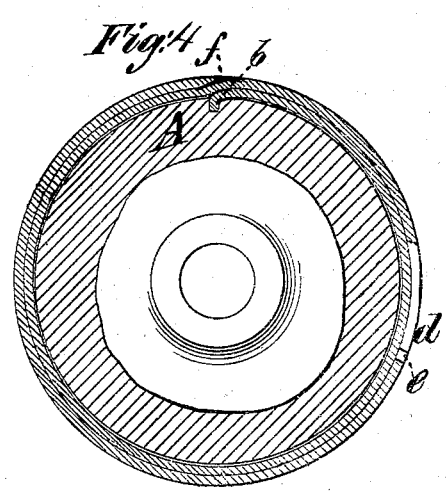
Witnesses:
Michael Ryan
Todd Haynes
H. A. Jamieson
by his Attorneys
Brown & Allen

UNITED STATES PATENT OFFICE.

HENRY A. JAMIESON, OF BROOKLYN, NEW YORK, ASSIGNOR OF ONE-HALF HIS RIGHT TO GEORGE WHITTAKER, OF SAME PLACE.

IMPROVEMENT IN PISTON-PACKINGS.

Specification forming part of Letters Patent No. 147,643, dated February 17, 1874; application filed September 2, 1873.

CASE D.

*To all whom it may concern:*

Be it known that I, HENRY A. JAMIESON, of the city of Brooklyn, in the county of Kings and State of New York, have invented an Improvement in Piston-Packings, of which the following is a specification:

This invention relates to the packings of circular pistons for steam-engines, pumps, and other purposes; and consists in a flat strip of metal or other suitable material coiled around an annular recessed portion of the piston and fast at its one end to the latter, while its other end is made to form a tongue-and-groove joint with the body of the strip which it meets or overlaps to prevent leakage, substantially as hereinafter described.

In the accompanying drawing, Figure 1 represents a sectional view of a piston, taken in direction of its axial line, with my improved packing applied thereto. Fig. 2 is a face view thereof; Fig. 3, an edge view of the same; and Fig. 4, a partly sectional view taken transversely through the axis of the piston on the irregular line $x\ x$.

Similar letters of reference indicate corresponding parts.

A is the piston, constructed to form an annular groove, within which the packing B is arranged. This packing is composed of a flat strip of elastic material, preferably metal, made fast at its one end, $b$, in any suitable manner, to the hub or body of the piston, and wound around the latter to form an elastic coil, with its free end arranged to enter the body of the strip by tongue-and-groove or slotted joint where the one portion meets or overlaps the other—as, for instance, by a single tongue, $d$, arranged to project in a direction encircling the piston, and to fit within a slot, $e$, in the body of the strip, which latter is indented or bent, as at $f$, to receive the beveled shoulders of the tongue. This construction provides for the elastic coil or strip conforming to the rotundity of the cylinder within which the piston works, and insures its making a close fit within said cylinder, free from all liability to leakage, either circumferentially or otherwise, and yet provides for the packing adapting itself to irregularities in the cylinder by its elasticity and freedom to coil or uncoil the same, forming a very lively yet close packing.

In the construction of said packing it is advisable not merely to attach the strip B at its inner end to the piston or to a mandrel upon which it may be turned, but also, after coiling it round the piston or mandrel, to temporarily rivet or otherwise lock its outer end, and then to turn the same in a lathe while in its place on the piston or mandrel, and afterward to liberate the outer end of the packing.

I claim as my invention and desire to secure by Letters Patent—

A piston-packing composed of a flat elastic strip coiled around the piston, and with its outer or free end constructed to form a tongue-and-groove joint with the body of the strip, substantially as specified.

HENRY A. JAMIESON.

Witnesses:
 HENRY T. BROWN,
 MICHAEL RYAN.